Oct. 14, 1958  M. A. COLER  2,856,449
APPARATUS FOR STORAGE OF ELECTRICAL APPARATUS
Original Filed Nov. 15, 1951
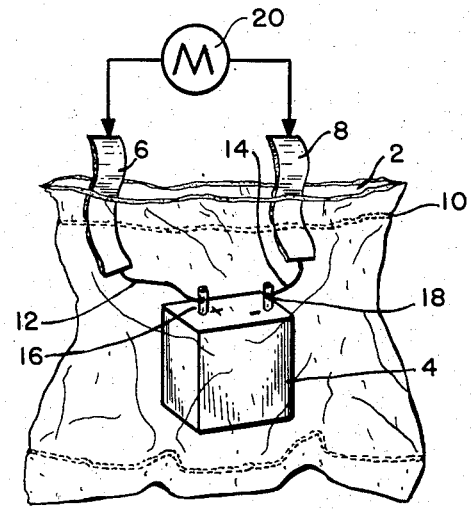
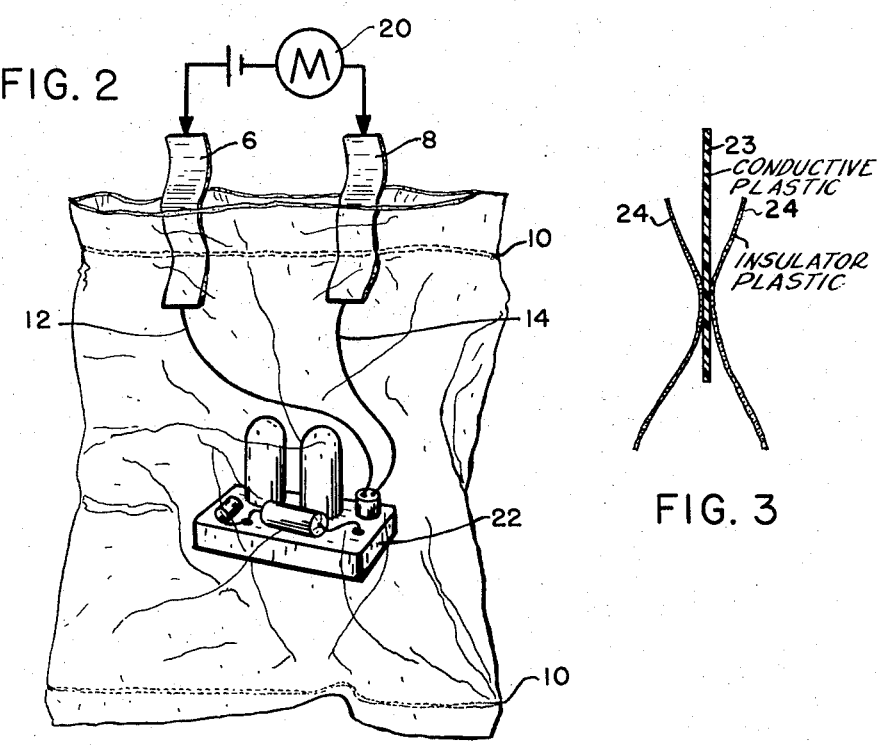
*INVENTOR.*
MYRON A. COLER
BY
*Leonard H. King*
AGENT United States Patent Office 2,856,449
Patented Oct. 14, 1958

2,856,449

APPARATUS FOR STORAGE OF ELECTRICAL APPARATUS

Myron A. Coler, New York, N. Y.

Continuation of application Serial No. 256,518, November 15, 1951, now Patent No. 2,825,748, dated March 4, 1958. This application September 3, 1954, Serial No. 454,126

2 Claims. (Cl. 174—50.64)

This invention relates to containers for electrical purposes and related devices useful for storage purposes.

This application is a continuation of my copending application entitled, "Containers and Related Devices," now U. S. Patent 2,825,748, issued March 4, 1958.

A problem which has long plagued designers of electrical equipment and of packages for the same has been the one of finding methods for effecting electrical contact through walls of insulating plastic material. This is a particular case of the still more general problem of securing a tight casing through which electrical contact may be made to material or equipment inside said casing.

Attempts to fabricate tight casings for electrical equipment generally break down into instances where the casing is predominantly metallic or predominantly insulator.

In the former case it is usually necessary to introduce more than one electrical connection to the interior of the casing. Usually at least one such connection must be insulated from the main casing body. The presence of the insulator invariably introduces problems associated with differences between the physical properties, especially the thermal expansion, of insulator and metal.

In some cases rubber insulated wire is passed through holes in the metal casing after which an attempt is made to tighten the seal by means of various kinds of clamps or packing glands. Such glands involve screwed or split parts which are seldom completely tight. The point of clamping the wire is a site for wear and fatigue. Flexible insulation and packing materials are subject to fairly rapid deterioration.

In another attempted solution of the problem, the parts of a metal casing are themselves used to carry electrical energy to or from the interior of the casing. This necessarily implies that certain parts of the casing are insulated from one another. Thus, for instance, two halves of a metal casing for an electro-chemical cell system may be shaped from sheet metal and the edges of the two halves crimped together over an insulating gasket. Such seals are found in practice to be subject to rather frequent failure.

In general, the longer the line of contact between metal and insulator material, the greater the difficulty in obtaining a tight seal. Thus, the common method of sealing a Leclanche cell by casting an insulating wax into the top of a zinc case is particularly subject to leakage under the stress of changing temperature.

The attempt to seal a structure which is made predominantly of insulator material with metal contacts likewise meets with practical difficulties.

The passage of metal contacts, such as wires, through a plastic body meets with the same difficulties due to differences in thermal expansion as exist in the converse arrangement.

For certain applications tight graded seals can be obtained between glass and metal wires. The seals are made by very exacting techniques and the resulting casings are obviously fragile.

There is disclosed herein a simple, effective and economical means for securing electrical connection across a tight casing wall by creating an integral bond between an electrically conductive composition plastic material and an insulator plastic thus avoiding the many cited drawbacks of the prior art.

It is therefore an object of this invention to provide tight casings through which electrical connection can be made.

It is a further object of this invention to provide uninterrupted plastic bodies through which electrical connections can be made.

It is a more general object of this invention to provide all-plastic structural elements which contain electrically conductive portions.

It is a specific object of this invention to provide all-plastic vapor-tight cell casings.

It is a particular object of this invention to provide a sealed storage container for electrical equipment which permits of period testing of said equipment without disturbing of said seal.

Other general and specific objects of this invention will become apparent upon perusal of the appended specifications.

For a more complete understanding of my invention, reference should now be made to the accompanying description taken in conjunction with the drawings in which:

Figure 1 pictorially depicts electronic equipment stored in a plastic container utilizing this invention.

Figure 2 shows in perspective and partially diagrammatically, a battery sealed into a bag incorporating this invention.

Figure 3 is a detailed cross-sectional view of an electroconductive plastic element sealed between films of insulator plastic.

As is well known, there exist numerous electrically conductive plastic compositions which are made by blending finely divided electrically conductive materials such as graphite and metals with insulator plastics. I have found that these materials correspond closely in their physical properties (aside from appearance and electrical conductivity) with the parent insulator plastics from which they are made. Of course, if the loading with conductive filler is very high, the strength and certain other properties of the plastic will be materially affected just as they will by the inclusion of more common fillers.

In any case, I have found that the conductive plastic compositions can be securely bonded by various methods detailed below to the corresponding insulator plastic from which they were made. Such bonds, being between materials possessing very similar coefficients of thermal expansion, are not subject to great stress when passed through cycles of changing temperature.

Electrically conductive plastics made according to the copending application of Myron A. Coler entitled "Metallized Plastics," Serial Number 735,553, filed March 18, 1947, now abandoned, are particularly suited to the purposes of the present invention because they possess much higher conductivity for a given content of conductive material than other known electrically conductive plastic compositions. Consequently, their general physical properties depart less from those of their parent plastics than do the properties of other conductive plastic compositions possessing the same degree of electrical conductivity.

Furthermore, be it noted that, by the use of techniques described in the copending application of Myron A. Coler and Arnold S. Louis entitled "Composite Plastic Articles and Method of Making Same," filed approximately November 15, 1951, now abandoned, the all-plastic seals of this invention need not necessarily be made between a conductive plastic composition and the insulator plastic from which it was made. It can, indeed, involve a joint between chemically quite different substances. Of course, the two plastic materials, conductive and insulator should be chosen so as to have similar thermal coefficients of expansion or else undue strains may be set up in the joint during service. The required degree of similarity will be determined by the conditions of temperature cycling to which the joint will be exposed. In any particular case the determination of a reasonable correspondence of thermal coefficients of expansion will call for the use of ordinary engineering judgement. In this connection it is well to note that if one of the plastics is relatively yielding or is comparatively thin, a large difference in coefficent of expansion can be tolerated.

A method of sealing batteries for storage which permits testing of batteries sealed away from the surrounding atmosphere is shown in Figure 1 wherein a plastic film which may be polyethylene forms a bag 2 and encloses battery 4. Electrically conductive plastic strips 6 and 8 having a base corresponding to that of the film are shown sealed into the bag at the time of forming the seal 10 which closes the bag. If desired, low resistance leads 12 and 14 may be connected from the strips 6 and 8 to the battery terminals 16 and 18. Meter 20 is shown in position to test the battery without breaking the package seal. The conductive plastic patches may be heat sealed to the insulator portion if thermoplastic materials are employed or solvent sealed if the materials are solvent sealable.

In a quite different application it is often desired to enclose military equipment in a sprayed plastic "cocoon" (typically composed of vinyl halide derivatives) to protect it against atmospheric attack. It is also desired to make electrical tests on such equipment from time to time.

Both ends may be achieved without the necessity of periodically breaking into and replacing the "cocoon" by mounting on the exterior of the equipment one or more of the structural elements disclosed in my copending application entitled "Containers and Related Devices," of which this application is a continuation. It is preferred that at least the insulator portion of said structural elements be made of the same resin as is the base for the webbing lacquer used in spinning the "cocoon." When the "cocoon" is spun the structural elements can be bonded into an integral part thereof. Electrical tests may then be easily made on the enclosed apparatus without disturbing the protective webbing.

In Figure 2 there is shown a typical electronic equipment 22 covered by a bag of a flexible plastic film 24 with conductive plastic inserts 6 and 8 sealed into it by hot die seal closure 10. Meter 20 may be used to test the equipment from a point outside the sealed bag. If desired additional conductive plastic inserts may be provided to permit the connection of a multiplicity of leads. Such additional leads may serve for providing input power and means for deriving an output signal from the electronic equipment.

The flat leads 6 and 8 of this invention may also be placed on a base sheet of plastic together with electronic equipment 22 and a plastic "cocoon" sprayed over it and the leads 6 and 8 to form a bag with conductive leads extending therethrough.

An alternate method of forming the container is to surround the article to be stored with two sheets of plastic which are then sealed together by dielectric heating, solvent, or hot die techniques. The conductive strips are sealed between the two sheets so as to extend from the inside of the thus formed container to the outside.

A particularly inexpensive container is formed from extruded polyethylene tubing which is then hot die sealed to close the ends of the tubing.

Conductive plastic inserts 6 and 8 are shown in greater detail in Figure 3 where there is shown the insulator plastic 24 to which a conductive plastic piece 23 is bonded. The plastic film or "cocoon" 24 being of the same base material as conductive plastic 23 bonds readily to it.

Suitable insulator materials included polychlorotrifluoroethylene, polytetrafluoroethylene, polyethylene, polyvinyl chloride, polyvinyl chloride-polyvinyl acetate copolymers, and polyvinylidene chloride sheeting or sprayed films. It is necessary, as pointed out earlier, that the electro-conductive plastic be sealable to the insulator.

The many embodiments of the invention disclosed herein are intended to be descriptive of what I currently believe to be the preferred version and are not intended to be limiting in any sense for it is appreciated that those skilled in the art may make many changes and adaptations without departing from the spirit of the invention and it is therefore my intent that the appended claims cover all such changes and adaptation as fall within the spirit and scope of the present invention.

I claim:

1. In combination with electrical equipment, a container formed of a non-conductive flexible plastic sheet enclosing said equipment, flat conductive plastic members extending into said container and sealed to the surfaces of said sheet and electrically connected to said equipment so as to permit testing said equipment from a point outside said container.

2. A battery enclosed by a hermetically sealed electrically non-conductive plastic container formed of a substantially flat sheet, a plurality of flat electro-conductive plastic members sealed between two layers of said flat sheet and having a first portion extending into said container and a second portion extending outside of said container, said first portions of said electro-conductive plastic members being electrically connected with said battery.

References Cited in the file of this patent

UNITED STATES PATENTS

| | | |
|---|---|---|
| 2,355,197 | Anthony | Aug. 8, 1944 |
| 2,364,903 | Howard | Dec. 12, 1944 |
| 2,369,716 | Coghill | Feb. 20, 1945 |
| 2,622,152 | Rosch | Dec. 16, 1952 |
| 2,635,128 | Arbogast | Apr. 14, 1953 |

OTHER REFERENCES

Publication: "Plastics Can Be Electrical Conductors," pages 60–63, 170, 172, 174, 176, 178, 180, in "Electrical Manufacturing" magazine, November 1949. (Copy available in Scientific Library.) 174–102.2.